(12) United States Patent
Dewan

(10) Patent No.: US 6,185,673 B1
(45) Date of Patent: Feb. 6, 2001

(54) APPARATUS AND METHOD FOR ARRAY BOUNDS CHECKING WITH A SHADOW REGISTER FILE

(75) Inventor: Gautam Dewan, San Jose, CA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 09/107,243

(22) Filed: Jun. 30, 1998

(51) Int. Cl.[7] .................. G06F 9/45; G06F 9/30; G06F 9/305; G06F 9/355
(52) U.S. Cl. .............. 712/228; 712/223; 712/231; 717/3; 717/8
(58) Field of Search .................. 345/523; 714/53, 714/55; 711/154; 717/1, 3, 5, 10, 214, 4, 8; 712/1, 36, 217, 228, 223, 15, 17, 18, 21, 22, 37, 227, 231, 245

(56) References Cited

U.S. PATENT DOCUMENTS 5,384,912 * 1/1995 Ogrinc et al. .................. 345/523
5,644,709 * 7/1997 Justin .................. 714/53

* cited by examiner

*Primary Examiner*—Daniel H. Pan
(74) *Attorney, Agent, or Firm*—William S. Galliani; Pennie & Edmonds LLP

(57) ABSTRACT

A circuit for processing source code with associated array bounds limitations includes an execution unit that generates a register value signal and an index number signal corresponding to an array value defined in a source code instruction. A primary register is connected to the execution unit. The primary register produces a base memory address signal in response to the register value signal. A shadow register is also connected to the execution unit. The shadow register produces an array bound value signal in response to the register value signal. An address computation circuit is connected to the execution unit and the primary register. The address computation circuit generates an effective memory address signal based upon the base memory address signal and the index number signal. An address comparison circuit generates an array bound error signal when an effective memory address associated with the effective memory address signal exceeds an array bound value associated with the array bound value signal.

14 Claims, 2 Drawing Sheets

APPARATUS AND METHOD FOR ARRAY BOUNDS CHECKING WITH A SHADOW REGISTER FILE

BRIEF DESCRIPTION OF THE INVENTION

This invention relates generally to the processing of secure computer code that has associated array bounds that limit memory accesses. More particularly, this invention relates to a hardware based technique for array bounds checking through the use of shadow registers.

BACKGROUND OF THE INVENTION

Secure computer code, such as JAVA, from SUN MICROSYSTEMS, INC., Mountain View, California, requires that all accesses to an array be checked to insure that the programmed code does not access prohibited memory spaces. An attempt to access a prohibited memory space must be trapped to insure computer security.

Array bounds checking of computer code can be appreciated with reference to an example associated with the JAVA programming language. Arrays are special types in JAVA. Arrays are used to keep similar information in the same place. Arrays hold a list of objects that can be referenced by indexing. For example, to create an array "a" of ten integers, the following code is used: "int a[]=new int [10]". Individual variables in the array are referenced by a number, for example, a[0], a[1], through a[9]. Note that the subscripts go from zero, the first element in the array, to the size of the array minus one.

Now suppose that a subsequent source code instruction states: "a[12]=4". This instruction attempts to load the value "4" into the twelfth position of the array "a". When the foregoing code is processed by a JAVA compiler, the JAVA compiler will perform a run-time bounds check. This bounds check requires the execution of several instructions. This processing is computationally expensive, especially when the array is in a loop. When the JAVA compiler identifies the foregoing bounds error, it will generate a message and subsequently prohibit processing of the source code.

In view of the foregoing, it would be highly desirable to reduce the array bounds processing burden on a compiler by providing a hardware based technique for array bound checking. Such a technique should be easy to implement. Ideally, such a technique would be controllable through existing software instructions. Thus, the compiler would not be required to process a new class of instructions.

SUMMARY OF THE INVENTION

The apparatus of the invention includes a circuit for processing source code with associated array bounds limitations. The apparatus includes an execution unit that generates a register value signal and an index number signal corresponding to an array value defined in a source code instruction. A primary register is connected to the execution unit. The primary register produces a base memory address signal in response to the register value signal. A shadow register is also connected to the execution unit. The shadow register produces an array bound value signal in response to the register value signal. An address computation circuit is connected to the execution unit and the primary register. The address computation circuit generates an effective memory address signal based upon the base memory address signal and the index number signal. An address comparison circuit generates an array bound error signal when an effective memory address associated with the effective memory address signal exceeds an array bound value associated with the array bound value signal.

The method of the invention includes the step of computing, with an array bounds check circuit, an effective memory address for an array value defined in a source code instruction. An array bound value is then read from a shadow register location defined in the source code instruction. A hardware error signal is then generated when the effective memory address exceeds the array bound value.

The invention reduces the array bounds processing burden on a compiler by providing a hardware based technique for array bounds checking. The technique of the invention can be implemented with well known hardware components. Advantageously, the disclosed technique can be implemented with existing software instructions. Consequently, the compiler is not required to process a new class of instructions.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
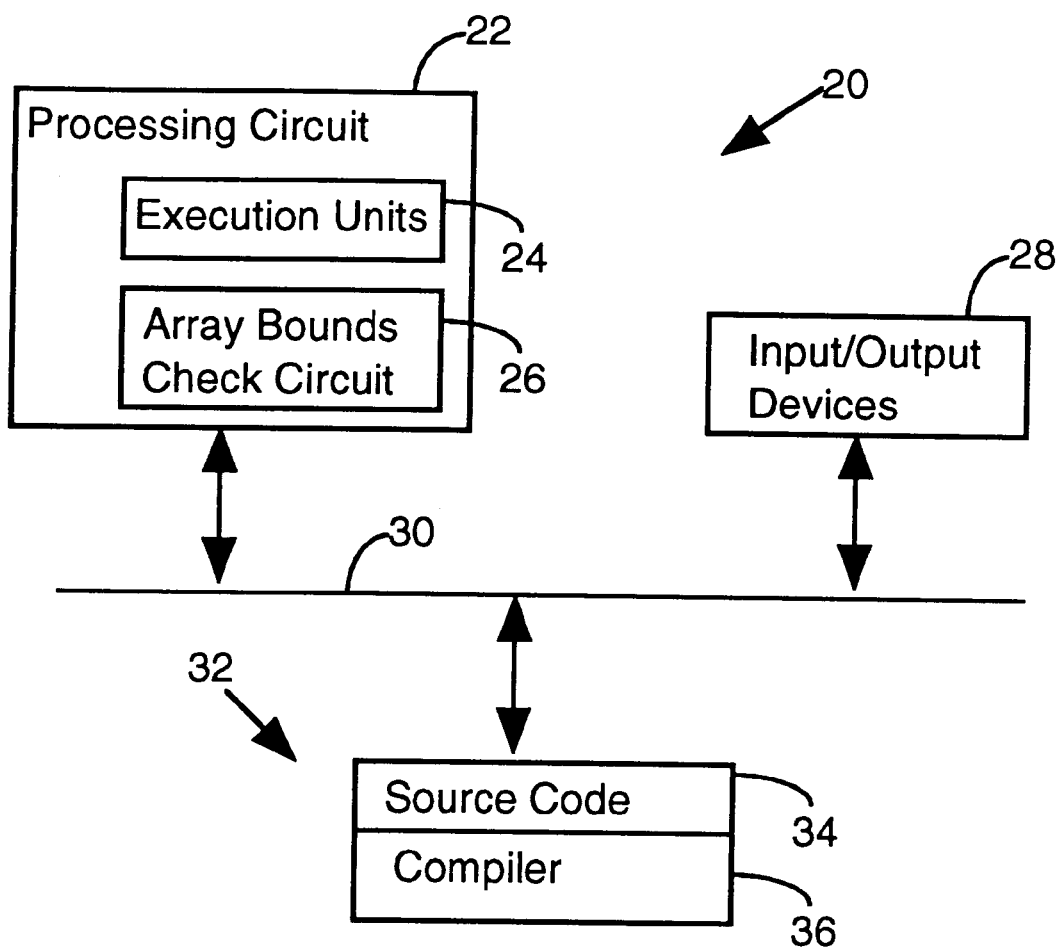
FIG. 1 illustrates a computer constructed in accordance with an embodiment of the invention.

FIG. 1 illustrates a computer 20 constructed in accordance with an embodiment of the invention. The computer includes a processing circuit 22. The processing circuit 22 includes standard execution units 24 and array bounds checking circuitry 26 in accordance with the invention. The processing circuit 22 may be a central processing unit of a computer, a silicon-based JAVA virtual machine, or the like. The processing circuit 22 is connected to a set of standard input/output devices 28 via a bus 30. By way of example, the standard input/output devices 28 include a keyboard, mouse, scanner, monitor, printer, etc. The processing circuit 22 is also connected to a memory 32 via the bus 30. The memory 32, which may be primary memory, secondary memory, or a combination of primary and secondary memory, stores source code 34 of a program to be executed. The source code 34 includes source code instructions that have array bounds limitations. The memory 32 also stores a compiler 36 for compiling the source code 34. As discussed below, the processing burden on the compiler is reduced by the processing performed by the array bounds check circuit 26.

The general processing interactions between a processing circuit 22, input/output devices 28, and a memory 32 are well known in the art. The present invention is directed toward the operation of the array bounds checking circuit 26 of the processing circuit 22.

Figure 2:
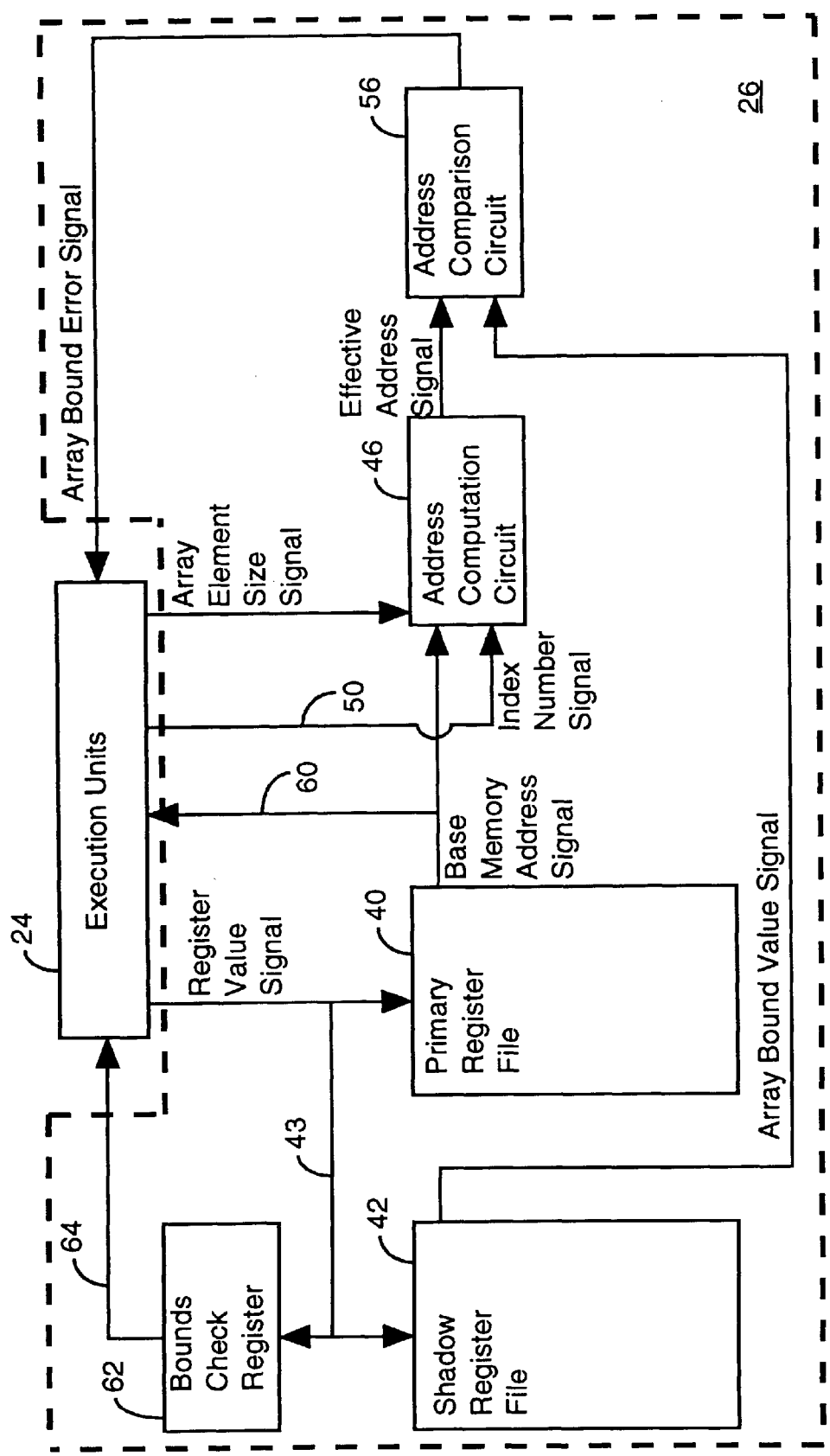
FIG. 2 illustrates a processing circuit constructed in accordance with an embodiment of the invention.

FIG. 2 is a more detailed view of the processing circuit 22. Standard execution units 24 interact with an array bounds check circuit 26 constructed in accordance with an embodiment of the invention. In accordance with standard processing techniques, the execution units 24 generate a register value signal, which is applied to a primary register file 40, via signal line 43. As known in the art, a primary register file 40 is a bank of registers.

In accordance with the invention, the same signal is sent to a shadow register file 42. The shadow register file 42 includes a bank of register duplicating the bank of registers of the primary register file 40. That is, for each register in the primary register file 40, there is a corresponding register in the shadow register file 42. Each register in the shadow register file 42 stores a bounds value for a corresponding register in the primary register file 40.

The register value signal from the execution units corresponds to a register value assigned to an array variable. For example, the integer array "a" discussed above may be assigned to a register R3 of the primary register file 40. In accordance with the invention, the same register value signal is applied to a register R3 of the shadow register file 42.

The register value signal causes the primary register file 40 to generate a base memory address signal on line 44. The base memory address signal specifies the address in memory for the specified array variable. The base memory address signal is passed to an address computation circuit 46. The address computation circuit 46 also receives an index number signal from line 50 and an array element size signal from line 48. These signals are also generated by the execution units 24. The index number signal specifies the index number associated with the array element that was specified in a source code instruction. For example, for the statement "a[3]=8", the value eight is to be loaded into the fourth position of the array "a". Therefore, the index number signal in this case would be four (recall that the first position is specified by a[0], therefore the fourth position is specified by a[3]). The array element size signal 48 is the size of each array element, for example, four bytes. This value is dependent upon the architecture of the processing circuit 22.

The address computation circuit 46 processes the array element size signal, the index number signal, and the base memory address signal to produce an effective memory address signal, which is routed onto line 52. The address computation circuit 52 calculates the effective memory address signal by adding a memory block product to the base memory address received form the primary register file 40. The memory block product is the product of the index number and the array element size. Relying upon the previous example where the index number was three (designating the fourth position) and the array element size was four bytes, the memory block product would be sixteen bytes, which is added to the base memory address. The resultant effective memory address represents the memory location for the array element specified in the source code instruction a[3]=8.

The effective memory address signal is routed to an address comparison circuit 56, which also receives an array bound value signal on line 54. As previously indicated, the array bound value signal represents the maximum array value for the array which was specified in the source code instruction. If the effective memory address signal exceeds the array bound value signal, then an array bound error signal is activated, for example, into a digital high state. The execution units 24 process this hardware error signal to generate an appropriate error message that is reported back to the individual attempting to execute the source code 34.

Observe that the primary register file 40 generates a base memory address signal on line 44, which may be immediately routed via line 60 to the execution units 24 for processing. This may be done if it is desirable to disable the bounds check operation. This processing may be implemented through the use of a bounds check register 62. The bounds check register 62 stores a bit for each register in the shadow register file 42. If a bounds value exists in a specified register of the shadow register file 42, then a bit corresponding to that specified register is activated (e.g., set to a digital high value). Therefore, if a bit in the bounds check register 62 is not activated (e.g., it is a digital low value), then a bound check operation need not be performed. The register value signal is applied to the bounds check register 62 over line 43. If the register value signal specifies a register in the shadow register file that does not have a bounds value within it, then the bounds check register 62 will produce an unactivated (e.g., digital low) bounds check register signal on line 64. This signal will advise the execution units 24 that they may immediately initiate processing of the base memory address signal from line 60. That is, the execution units need not wait for the processing of the address computation circuit 46 and the address comparison circuit 56, which produce the array bound error signal. Conversely, an activated (e.g., digital high) bounds check register signal online 64 advises the execution units 24 that processing cannot proceed until the array bound error signal is received.

The array bound values may be loaded into the shadow register file 42 using standard software instructions. For example, if a software programmer wishes to use address registers 1, 3, and 9 to access arrays that have bounds "b1", "b2", and "b3", the following instructions may be used:

store "b1""in BOUNDS REGISTER 1 store "b2""in BOUNDS REGISTER 3 store "b3""in BOUNDS REGISTER 9 write a 1 in bit positions 1, 3, and 9 of BOUNDS CHECK REGISTER

Subsequently, all load store accesses that derive their addresses from primary register file registers 1, 3, and 9 will be automatically bounds checked against the bounds stored in the corresponding shadow registers. To disable bounds checking for primary memory register N, the programmer generates an instruction to write a "0" bit in position N of the bounds check register.

Those skilled in the art will recognize a number of benefits associated with the apparatus of the invention. Since there is a direct correspondence between each primary register and its shadow register, no conversion tables or other mechanisms are required to link a bound value to a variable. The technique of the invention can be implemented with existing source code instruction sets. That is, no new instructions (e.g., LOAD BOUND CHECK) are required, thus the invention does not require expensive new tools, such as new design tools, compilers, linkers, etc.

The invention reduces the array bounds processing burden on a compiler by providing a hardware based technique for array bounds checking. The technique of the invention can be implemented with well known hardware components.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A circuit for processing source code with associated array bounds limitations, comprising:
   an execution unit that generates a register value signal and an index number signal corresponding to an array value defined in a source code instruction;
   a primary register connected to said execution unit, said primary register producing a base memory address signal in response to said register value signal;
   a shadow register connected to said execution unit, said shadow register producing an array bound value signal in response to said register value signal;
   an address computation circuit connected to said execution unit and said primary register, said address computation circuit generating an effective memory address signal based upon said base memory address signal and said index number signal; and
   an address comparison circuit to generate an array bound error signal when an effective memory address associated with said effective memory address signal exceeds an array bound value associated with said array bound value signal.

2. The circuit of claim 1 wherein said execution unit generates an array element size signal and said address computation circuit multiplies said array element size signal by said index number signal to produce a memory block product signal, said address computation circuit adding said memory block product signal to said base memory address signal to yield said effective memory address signal.

3. The circuit of claim 2 further comprising a bound check register connected to said execution unit, said bound check register storing a bit value corresponding to said shadow register, said bit value specifying when said base memory address signal is processed by said execution unit prior to receiving said array bound error signal.

4. The circuit of claim 1 in combination with a system bus, a plurality of input/output devices, and a memory.

5. A method of processing source code with associated array bounds limitations, said method comprising the steps of:
   computing, with an array bounds check circuit, an effective memory address for an array value defined in a source code instruction, said computing including accessing a base memory address stored in a primary register and multiplying an array element size value by an array index value to obtain a memory block product;
   reading an array bound value from a shadow register location defined in said source code instruction; and
   generating a hardware error signal when said effective memory address exceeds said array bound value.

6. The method of claim 5 wherein said computing includes adding said memory block product to said base memory address to yield said effective memory address.

7. The method of claim 5 further comprising loading array bounds values into said shadow register in response to software instructions.

8. The method of claim 5 further comprising the step of processing said base memory address before said hardware error signal is generated.

9. The method of claim 8 wherein said processing is performed in response to a bit value in a bound check register, said bit value in said bound check register corresponding to said shadow register location.

10. A method of processing computer instructions with associated array bounds limitations, comprising the steps of:
    accessing a base memory address;
    computing a memory block product from an array element size value and an array index value;
    adding said memory block product to said base memory address to yield an effective memory address;
    reading an array bound value; and
    generating an error signal when said effective memory address exceeds said array bound value.

11. The method of claim 10 wherein said accessing includes accessing said base memory address in a primary register.

12. The method of claim 11 further comprising the step of processing said base memory address before said error signal is generated.

13. The method of claim 12 wherein said processing is performed in response to a bit value in a bound check register, said bit value in said bound check register corresponding to said shadow register location.

14. The method of claim 10 further comprising the step of loading array bounds values into a shadow register in response to software instructions.

* * * * *